Oct. 14, 1969  F. E. WAGSTAFF  3,472,667
ELEMENTAL BORON-CONTAINING VITREOUS SILICA BODIES AND METHOD
Filed July 6, 1966
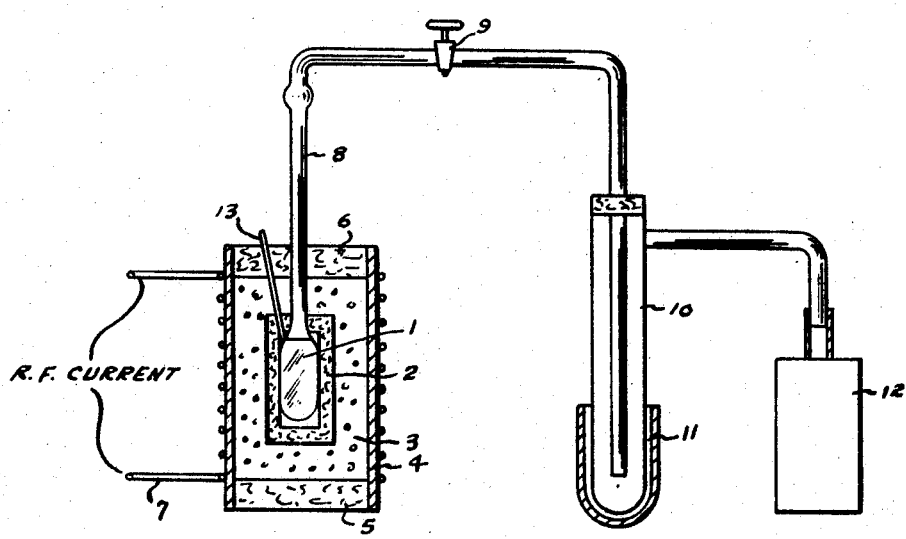
INVENTOR.
FRANK E. WAGSTAFF
BY
ATTORNEYS United States Patent Office 3,472,667
Patented Oct. 14, 1969

3,472,667
ELEMENTAL BORON-CONTAINING VITREOUS
SILICA BODIES AND METHOD
Frank E. Wagstaff, 23 Kile Drive,
Scotia, N.Y. 12302
Filed July 6, 1966, Ser. No. 565,046
Int. Cl. C03c 3/08, 3/04; C04b 35/14
U.S. Cl. 106—52
2 Claims

ABSTRACT OF THE DISCLOSURE

Oxygen-deficient, vitreous silica bodies containing elemental boron are prepared. Preparation is accomplished by mixing about 0.1 to 1 weight percent of high purity elemental boron powder with 99.9 to 99 weight percent of high purity silica powder, fusing by bringing the temperature of the mixture to 1350° C. in one-half hour under vacuum, keeping the temperature at 1350° C. for one hour, then raising the temperature to 1850° C. in one hour and keeping it at 1850° C. for 15 minutes, and finally cooling the mixture.

---

The invention described herein may be manufactured and used by or for the United States Government for governmental purposes without the payment to me of any royalty thereon.

The present invention relates generally to the ceramics art and is more particularly concerned with novel vitreous silica bodies having superior resistance to devitrification and with a new method of producing these novel bodies.

The marked tendency for vitreous silica to devitrify at elevated temperatures has constituted a serious problem of long-standing in the art. Thus, the use of quartz envelopes for high-temperature lamps, for windows in structures subjected to extreme thermal differentials and for high-temperature were capable of withstanding severe thermal shock, has been limited because as the quartz devitrifies in such uses it loses both transparency and physical strength.

Prior efforts of others to solve this problem have, to the best of my knowledge, never been successful. However, by virtue of this invention and in my invention disclosed and claimed in my copending patent application Ser. No. 519,806, filed Nov. 22, 1965, now Patent No. 3,370,921, devitrification of silica for such uses and environments can effectively be minimized over protracted periods. Both these inventions are predicated upon my basic discovery that a deficiency of oxygen minimizes growth of cristobalite on and in quartz bodies. Such a below-stoichiometric proportion of oxygen in quartz, I have further found, can be established and maintained by associating with the quartz or silica body either elemental silicon as disclosed and claimed in my aforesaid pending application, or elemental boron in accordance with the present invention. Thus cristobalite, which nucleates on the surfaces of quartz bodies, grows as a crystalline phase from these surfaces into the bodies and this growth is limited or controlled by providing in the bodies and particularly in their surface portions a small amount of silicon or boron which assures an oxygen deficiency and hence an adverse condition for cristobalite crystal growth in the critical superficial portions of these quartz bodies.

Briefly described, this invention in its article or product aspect comprises an oxygen-deficient vitreous silica body consisting essentially of silica and elemental boron in which the proportion of elemental boron to silica is from one part to 20 parts to one part to 10,000 parts. In a preferred embodiment of the invention, the vitreous silica body is in the form of a calcining tray and the elemental boron is present in the body in the amount of one-half percent to five percent, the balance being substantially all silica. Further, optimally, the vitreous silica body contains 99 percent silica and one percent elemental boron for products not requiring good optical properties. For use in lamp envelopes or windows in furnaces and the like, these new quartz bodies should contain no more than about 0.10 percent elemental boron.

In its method aspect, this invention generally described comprises the steps of mixing boron powder with vitreous silica powder, fusing the resulting powder mixture to form a glass, and cooling and freezing the resulting glass. Again, in the preferred practice of the invention, −80 mesh (Tyler Standard Screen) silica powder containing less than 0.5 percent total impurities and less than 0.01 percent water is mixed with −100 mesh (Tyler Standard Screen) boron powder containing less than 0.5 percent total impurities and less than 0.01 percent water. The resulting substantially homogeneous mixture of at least 95 percent silica and no more than five percent boron is fused by heating it to 1350° C. in one-half hour and then maintained at 1350° C. for one hour and thereafter the mixture temperature is raised to 1850° C. in one hour and then maintained at 1850° C. for 15 minutes, and finally the resulting glass body is furnace cooled. Articles produced by this method can be heated and softened and reshaped in conventional ways to produce a variety of products, all of which will exhibit prolonged resistance to devitrification because of the presence in them, and particularly in their surface portions, of elemental boron and the accompanying oxygen-deficiency condition described above.

Those skilled in the art will gain a further understanding of this invention and the best mode of practicing it from the following detailed description, reference being made to the drawing accompanying and forming a part of this specification in which apparatus implementing the present novel method is illustrated in a schematic diagram of an induction furnace for the fusion of vitreous silica powder.

In the drawing, a charge 1 of highly purified vitreous silica powder, to which a desired addition of boron has been added, is positioned within a graphite susceptor 2. The graphite susceptor 2 is embedded in bubbled zirconia 3 packed inside of a cylindrical shell 4 that is plugged at its opposite ends by Fiberfrax discs 5 and 6. The shell is heated by a radio-frequency current supplied winding 7 of water-cooled copper tubing, or the like.

The graphite susceptor 2 opens through a vapor-conducting conduit 8 that is releasably closed by a stop cock 9, or the like. Vapor that results from heating the charge within the graphite susceptor 2, is conducted by the conduit 8 for condensation within a trap 10. The trap 10 is immersed within and is chilled by a liquid nitrogen cold trap 11. The trap 10 is exhausted by means of a diffusion and mechanical pump 12.

In the experimental work, out of which the present invention arose, the glass used was prepared from Corning Glass Works Type 7940 Synthetic Vitreous Silica, which is a very pure $SiO_2$ containing approximately 0.1 of one percent of chemically combined water.

The material was crushed in a copper electrode grade crushing device of the general design of a diamond mortar. Small pieces of glass were pulverized until the powder passed through an 80-mesh sieve. Concentrated nitric acid was used to leach out the copper impurities picked up in the crushing operation. The volume of nitric acid used was approximately five times the volume of the crushed powder. The material was leached for approximately 24 hours, after which the nitric acid solution was decanted and discarded. The powder was washed in a Buchner funnel using successively distilled water and then a five percent hydrofluoric acid solution. The final wash was with distilled water.

After drying, the material was placed in a fused quartz crucible and fired in a vacuum at 1080° C. for 300 hours to remove the chemically combined water. To this powder was added one weight percent of finely powdered boron and the combination was mixed in a boron carbide mortar and pestle. The fusion to form the glass was performed in an apparatus such as that shown schematically in the accompanying drawing.

The powder charge of silica and boron was packed in a fused quartz tube and was connected to the vacuum system as shown. Temperatures were measured with an optical pyrometer by sighting through the tube 13 on the top of the fused quartz sample container. Under a vacuum of $10^{-6}$ torr, the batch was heated to 1350° C. in one-half hour and was maintained at 1350° C. for one hour, after which the temperature was raised to 1850° C. in one hour and was maintained at that temperature for 15 minutes. At completion, the induction generator was turned off and the batch was cooled with the furnace.

During the heating process, atmospheric pressure collapsed the evacuated fused quartz tube containing the powder to produce a bubble-free glass. The fused quartz tube providing the original sample container melted with the glass batch. Since the glass is very viscous, there is little mixing and the outer surface corresponding to the original tube may be cut away.

It will be understood by those skilled in the art that the foregoing operation may readily be scaled up in size and also that this invention can be employed in conventional manufacturing operations such as those employed in the production of quartz lamp envelopes. In the latter case, the amount of boron used will be limited so that the finished article does not contain an amount of elemental boron sufficient to impair optical properties (transparency), i.e., more than 0.10 percent boron for some purposes and somewhat less for other purposes requiring a high degree of transparency. Also, as indicated above, the mixing of the elemental boron in the quartz mass will be such as to assure the presence in the surface portions of the finished product, that is, the lamp envelope, of elemental boron to minimize or block growth of cristobalite crystals through the envelope.

I claim:

1. The method of making oxygen-deficient vitreous silica bodies containing elemental boron, said method comprising forming a mixture by mixing (a) not less than 0.10 and not more than 1 weight percent of elemental $-1000$ mesh boron powder containing less than 0.5 percent impurities and less than 0.01 percent water with (b) not more than 99.9 and not less than 99.0 weight percent of $-80$ mesh high purity silica powder containing less than 0.5 percent impurities and less than 0.01 percent water; and fusing said mixture by heating said mixture to 1350° C. in one-half hour under a vacuum of approximately $10^{-6}$ torr, maintaining the mixture temperature at 1350° C. for one hour, then raising the mixture temperature to 1850° C. in one hour, and maintaining the mixture temperature at 1850° C. for 15 minutes, and finally furnace cooling the mixture.

2. Oxygen-deficient vitreous silica bodies containing elemental boron and formed by the method of claim 1.

References Cited

UNITED STATES PATENTS

| | | | |
|---|---|---|---|
| 1,091,679 | 3/1914 | Locke | 106—54 |
| 2,904,713 | 9/1959 | Heraeus et al. | 106—52 X |
| 3,026,210 | 3/1962 | Coble | 106—39 |

HELEN M. McCARTHY, Primary examiner

W. R. SATTERFIELD, Assistant Examiner

U.S. Cl. X.R.

23—182; 106—39, 54